United States Patent
Tai et al.

(10) Patent No.: US 6,466,331 B1
(45) Date of Patent: Oct. 15, 2002

(54) MULTI-BIT RENDERING WITH SINGLE COLOR AND TWO-COLOR CAPABILITY

(75) Inventors: Hwai-Tzuu Tai; Yee Seung Ng; Richard George Allen, all of Rochester, NY (US)

(73) Assignee: Nexpress Solutions LLC, Rochester, NY (US)

( * ) Notice: Subject to any disclaimer, the term of this patent is extended or adjusted under 35 U.S.C. 154(b) by 1095 days.

(21) Appl. No.: 08/630,294

(22) Filed: Apr. 10, 1996

Related U.S. Application Data

(60) Provisional application No. 60/001,992, filed on Aug. 7, 1995.

(51) Int. Cl.[7] .............................................. G06F 13/00
(52) U.S. Cl. ........................ 358/1.9; 358/298; 399/223
(58) Field of Search .................................. 395/109, 110; 358/298, 455, 456, 500, 501, 502, 457, 459, 518, 538, 529, 521, 522, 532; 399/223, 226, 238, 232; 355/326, 245, 328, 327

(56) References Cited

U.S. PATENT DOCUMENTS

| | | | |
|---|---|---|---|
| 4,078,929 A | | 3/1978 | Gundlach |
| 4,562,130 A | * | 12/1985 | Oka .............................. 430/54 |
| 4,791,452 A | * | 12/1988 | Kasai .......................... 358/529 |
| 4,794,421 A | | 12/1988 | Stoudt et al. |
| 4,903,048 A | * | 2/1990 | Harrington ................... 358/298 |
| 5,049,949 A | * | 9/1991 | Parker et al. ................ 355/328 |
| 5,079,114 A | | 1/1992 | Williams |
| 5,155,541 A | * | 10/1992 | Loce et al. ................... 355/328 |
| 5,208,663 A | * | 5/1993 | Hiratsuka et al. ............ 358/500 |
| 5,221,954 A | * | 6/1993 | Harris ......................... 355/327 |
| 5,241,359 A | | 8/1993 | Williams |
| 5,258,849 A | | 11/1993 | Tai et al. |
| 5,258,850 A | | 11/1993 | Tai |
| 5,305,069 A | | 4/1994 | Nakano |
| 5,339,135 A | * | 8/1994 | Scheuer et al. .............. 355/208 |
| 5,347,345 A | | 9/1994 | Osterhoudt |
| 5,373,313 A | * | 12/1994 | Kovacs ........................ 346/157 |
| 5,418,097 A | * | 5/1995 | Furuya et al. ................. 430/42 |
| 5,500,727 A | * | 3/1996 | Maruyama et al. .......... 355/326 |
| 5,581,292 A | * | 12/1996 | Cianciosi et al. ............ 358/459 |
| 5,581,375 A | * | 12/1996 | Ma .............................. 358/518 |
| 5,587,813 A | * | 12/1996 | Yamazaki et al. ........... 358/505 |
| 5,589,950 A | * | 12/1996 | Fujimoto et al. ............ 358/455 |

* cited by examiner

Primary Examiner—Mark Wallerson

(57) ABSTRACT

In an electrostatographic recording apparatus and method of forming images on a charge retentive surface such as a photoconductive member using a single writer source, the surface is uniformly charged by a corona charger to a predetermined voltage potential level. An image frame is then exposed on a pixel by pixel basis with varying amounts of exposure by the source for at least some pixels to form a tri-state type of latent image on the image frame including a charged area developable (CAD) latent image having at least some exposed pixels at various different sub-levels of exposure within the CAD latent image, a discharged-area developable (DAD) latent image having at least some exposed pixels at various different sub-levels of exposure within said discharged area developable image, and a background area The DAD and CAD latent images are then developed with toners of two different colors by two different developer sources. A second image frame of the uniformly charged surface is also exposed on a pixel by pixel basis with varying amounts of exposure by the source for at least some pixels to form a monochrome latent image wherein at least some exposed pixels are exposed at various different levels of exposure. The monochrome latent image is developed using one of the developer sources and this source is biased differently on the monochrome exposure made from the bias used in the two-color exposure mode. Data representing multicolor pixels are analyzed in accordance with criteria and a determination is made as to whether the pixel is to be recorded in black or another color in the tri-state recording mode.

28 Claims, 7 Drawing Sheets

*DIFFERENT EXPOSURE SETTINGS

MULTI-BIT RENDERING WITH SINGLE COLOR AND TWO-COLOR CAPABILITY

CROSS REFERENCE TO RELATED APPLICATION

Reference is made to and priority claimed from U.S. Provisional Application Ser. No. US 60/001,992, filed Aug. 7, 1995, entitled MULTI-BIT RENDERING WITH SINGLE COLOR AND TWO-COLOR CAPABILITY.

BACK GROUND OF THE INVENTION

This invention relates generally to methods and apparatus for electrostatographic recording using multi-bit rendering devices.

DESCRIPTION RELATIVE TO THE PRIOR ART

In general, in electrostatographic recording it is known to form electrostatic latent images on a xerographic surface by first uniformly charging a charge retentive surface such as a photoreceptor. The charged area is selectively dissipated in accordance with a pattern of activating radiation corresponding to original images. The selective dissipation of the charge leaves a latent charge pattern on the imaging surface corresponding to the areas not exposed by radiation.

This charge pattern is made visible by developing it with toner by passing the photoreceptor past a single developer housing. The toner is generally a colored powder which adheres to the charge pattern by electrostatic attraction. The developed image is then fixed to the imaging surface or is transferred to a receiving substrate such as plain paper to which it is fixed by suitable fusing techniques.

In U.S. Pat. Nos. 5,258,849 and 5,258,850, there is taught that higher image quality can be achieved using multi-bit rendering. In multi-bit rendering, various shades of a color or gray may be achieved by selectively imagewise exposing the photoreceptor at different minute areas or pixel recording areas to different amounts of exposure so that different amounts of toner are selectively attracted to such areas. The results are that the pixel areas develop different densities according to such exposures and improved tone scale rendition is possible.

Improvements in the art of electrostatographic recording include the capability of recording in two or more colors. One aspect of this technology which has developed some attention in multiple color recording is tri-state highlight xerography which has evolved primarily as tri-level highlight xerography. The term tri-state highlight xerography as used herein implies that three states may exist on the same image flame allowing development of certain areas in one color, certain other areas in another color and still other areas with either a third color or no development.

The concept of tri-level, highlight color xerography is described in U.S. Pat. No. 4,078,929. This patent discloses the use of tri-level, xerography as a means to achieve single-pass highlight color imaging. As disclosed therein, the charge pattern is developed with toner particles of first and second colors. The toner particles of one of the colors are positively charged and the toner particles of the other color are negatively charged. In one embodiment, the toner particles are supplied by a developer which comprises a mixture of triboelectrically relatively positive and relatively negative carrier beads. The carrier beads support, respectively, the relatively negative and relatively positive toner particles. Such a developer is generally supplied to the charge pattern by cascading it across the imaging surface supporting the charge pattern. In another embodiment, the toner particles are presented to the charge pattern by a pair of magnetic brushes. Each brush supplies a toner of one color and one charge. In yet another embodiment, the development systems are biased to about the background voltage. Such biasing results in a developed image of improved color sharpness.

In U.S. Pat. No. 5,347,345, there is disclosed an improvement upon tri-level color xerography wherein two-color images in a single pass is provided but using toners of the same polarity. This provides an image that is more readily transferred to a receiver sheet.

The interest in tri-level xerography appears directed to several factors. Firstly, registration of the color images can be better controlled since the separate color latent images are recorded by the same exposure source on the same image frame at the same time. Thus, registration of the separate latent images can be made down to the pixel resolution of the recording source. A second factor involves productivity since only one image frame is used to record a two-color developed image and only one transfer of the image to a receiver sheet is required, hence, the term "single-pass" is associated with this technology.

In U.S. Pat. No. 5,241,359, there is disclosed an image creation apparatus operable in a tri-level highlight color imaging or a black monochrome mode. The developer structures are biased in the tri-level mode using a chopped DC bias while in the monochrome black mode only the black developer structure is biased using a standard monochrome bias.

In U.S. Pat. No. 5,305,069, a single-pass, two-color tri-level xerographic apparatus is described wherein improved tone rendition is provided using a dithering approach wherein several tone scales are provided by combinations of several adjacent pixels. Thus, an area of 4×4 pixels, say red, may appear more dense than an area of 2×2 red pixels and so on. In order to accomplish imaging for the two colors, a current driver to a laser is supplied supplemental current when recording in the red color whereas for recording the white background, no supplemental current is provided. In addition to the dithering method, this patent discloses the creation of density tone gradation by laser beam irradiation per pixel wherein the irradiation period is controlled by a pulsewidth modulation in accordance with image density signals.

A problem with the prior art is that the improved image quality obtainable using multi-bit writers has not been effectively utilized in copiers/printers that are able to form color images in a single-pass, as well as a single-color image. The invention and its objects address this problem.

SUMMARY OF THE INVENTION

In accordance with the invention, there is provided a method and apparatus of forming images on a charge retentive surface using a single writer source, the invention including uniformly charging said surface; exposing in one image frame of said surface on a pixel by pixel basis with varying amounts of exposure by said source for at least some pixels to form a latent image including a) a charged area developable (CAD) latent image having at least some exposed pixels at various different sub-levels of exposure within said charged area developable image, (b) a discharged-area developable (DAD) latent image having at least some exposed pixels at various different sub-levels of exposure within said discharged area developable image, and (c) a background area; developing said DAD and CAD latent images with toners of two different colors from respective two different developer sources; exposing a second image frame of said uniformly charged surface on a pixel by pixel basis with varying amounts of exposure by said source for at least some pixels to form a monochrome latent image wherein at least some exposed pixels are exposed at various different levels of exposure; and developing said monochrome latent image using one of said developer sources and wherein a voltage bias on said one of said developer sources is adjusted to a different bias when operating in a monochrome exposure mode than when operating in a two-color exposure mode.

In accordance with another aspect of the invention, there is provided a method and apparatus of forming two-color images on a charge retentive surface using a single writer source, the invention including uniformly charging said surface; exposing in one image frame of said surface on a pixel by pixel basis with varying amounts of exposure by said source at least some pixels to form a latent image including (a) a charged area developable (CAD) latent image having at least some pixels within said charged area developable image, (b) a discharged-area developable (DAD) latent image having at least some pixels within said discharged area developable image, and (c) a background area; developing said CAD and DAD latent images with toners of two different colors from respective two different developer sources; and including the step of processing signals representing a pixel having multicolor components in accordance with a set of criteria to determine whether the pixel is to be recorded on said one image frame as one color or the other color of said two different colors.

In accordance with yet another aspect of the invention, there is provided a method of forming images on a charge retentive surface using a single writer source, said method comprising the steps of uniformly charging said surface; exposing in one image frame of said surface on a pixel by pixel basis with varying amounts of exposure by said source for at least some pixels to form a latent image including (a) a charged area developable (CAD) latent image having at least some exposed pixels at various different sub-levels of exposure within said charged area developable image, (b) a discharged-area developable (DAD) latent image having at least some exposed pixels at various different sub-levels of exposure within said discharged area developable image, and (c) a background area; developing said DAD and CAD latent images with toners of two different colors from respective two different developer sources; exposing a second image frame of said uniformly charged surface on a pixel by pixel basis with varying amounts of exposure by said source for at least some pixels to form a monochrome latent image wherein at least some exposed pixels are exposed at various different levels of exposure; developing said monochrome latent image using one of said developer sources and wherein the different levels of exposure in the monochrome latent image mode and the different sub-levels of exposure in at least one of the CAD and DAD latent images have the exposures uniformly stepped in lightness space.

In accordance with still another aspect of the invention, there is provided a method of forming two-color images on a charge retentive surface using a single writer source, said method comprising the steps of uniformly charging said surface; exposing in one image frame of said surface on a pixel by pixel basis with varying amounts of exposure by said source at least some pixels to form a latent image including (a) a charged area developable (CAD) latent image having at least some pixels within said charged area developable image, (b) a discharged-area developable (DAD) latent image having at least some pixels within said discharged area developable image, and (c) a background area; developing said CAD and DAD latent images with toners of two different colors from respective two different developer sources; and including the steps of modifying a value associated with a pixel with an error value associated with rendering of prior processed pixels to obtain a modified pixel value and in response to signals representing said modified pixel value determining whether the pixel is to be recorded on said one image frame as one color or the other color of said two different colors.

BRIEF DESCRIPTION OF THE DRAWINGS

The novel features that are considered characteristic of the invention are set forth with particularity in the appended claims. The invention itself, however, both as to its organization and its method of operation together with objects and advantages thereof will be best understood from the following description of the illustrated embodiments when read in connection with the accompanying drawings wherein:

DESCRIPTION OF THE PREFERRED EMBODIMENT

Figure 1:
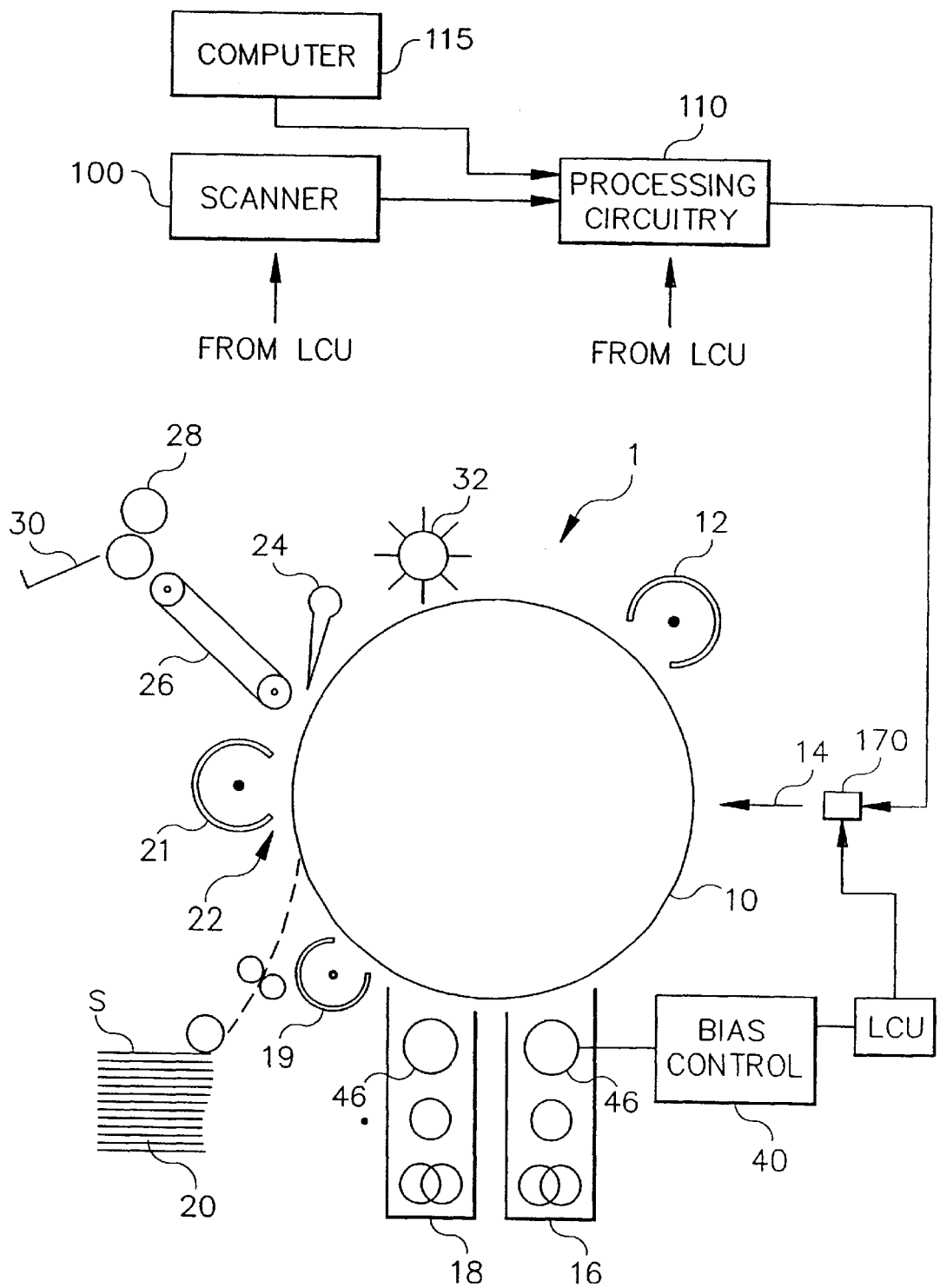
FIG. 1 is a side elevational view in schematic form of an apparatus that is in accordance with one embodiment of the invention.

FIG. 1 shows an image-forming apparatus in which the invention is usable. An image member 10, for example, a photoconductive drum or web (generally a charge retentive member) is uniformly charged by a corona charger 12 to a charge of a first polarity. The uniformly charged surface is imagewise exposed, for example, by a laser 14 or LED (light-emitting diode printhead) or similarly suitable exposure source to create an electrostatic image. The electrostatic image is toned by one or both of toning stations 16 and 18 to create a toner image. The toner image is transferred at a transfer station 22 to a receiving sheet S fed from a receiving sheet supply by the application of an electrical field, for example, a positive electrical field created by a corona charger 21. The receiving sheet with the toner image is separated from the image member 10 by an air puffer 24 and transported by transport 26 to a fuser 28 where the image is fixed and, ultimately, fed to an output tray 30. The surface of image member 10 is continuously cleaned by cleaning device 32. Biases are applied to the toning stations 16 and 18 by a bias control device 40.

The image-forming apparatus shown in FIG. 1 is used to make a two-color toner image with a single pass of image member 10 past the toner image forming stations 12, 14, 16, 18 and 22. Utilizing conventional tri-state xerography this is accomplished with the exposure utilizing laser 14 or an LED printhead or similarly suitable exposure source which places the portions of the image that are intended to be toned with a first color toner at a high potential. The portions that are intended to be toned with a second color toner are placed at a low potential. The background is placed at a middle electrical potential. In conventional tri-state xerography, opposite polarity toners are used to tone the high and low potentials, with careful bias control attempting to maintain clean the middle potential background. Transfer may be improved by locating an additional positive pre-transfer corona discharge member 19 is provided downstream of the developer stations to condition the toner for effective transfer to the substrate such as sheet S using positive corona discharge.

Figure 2:
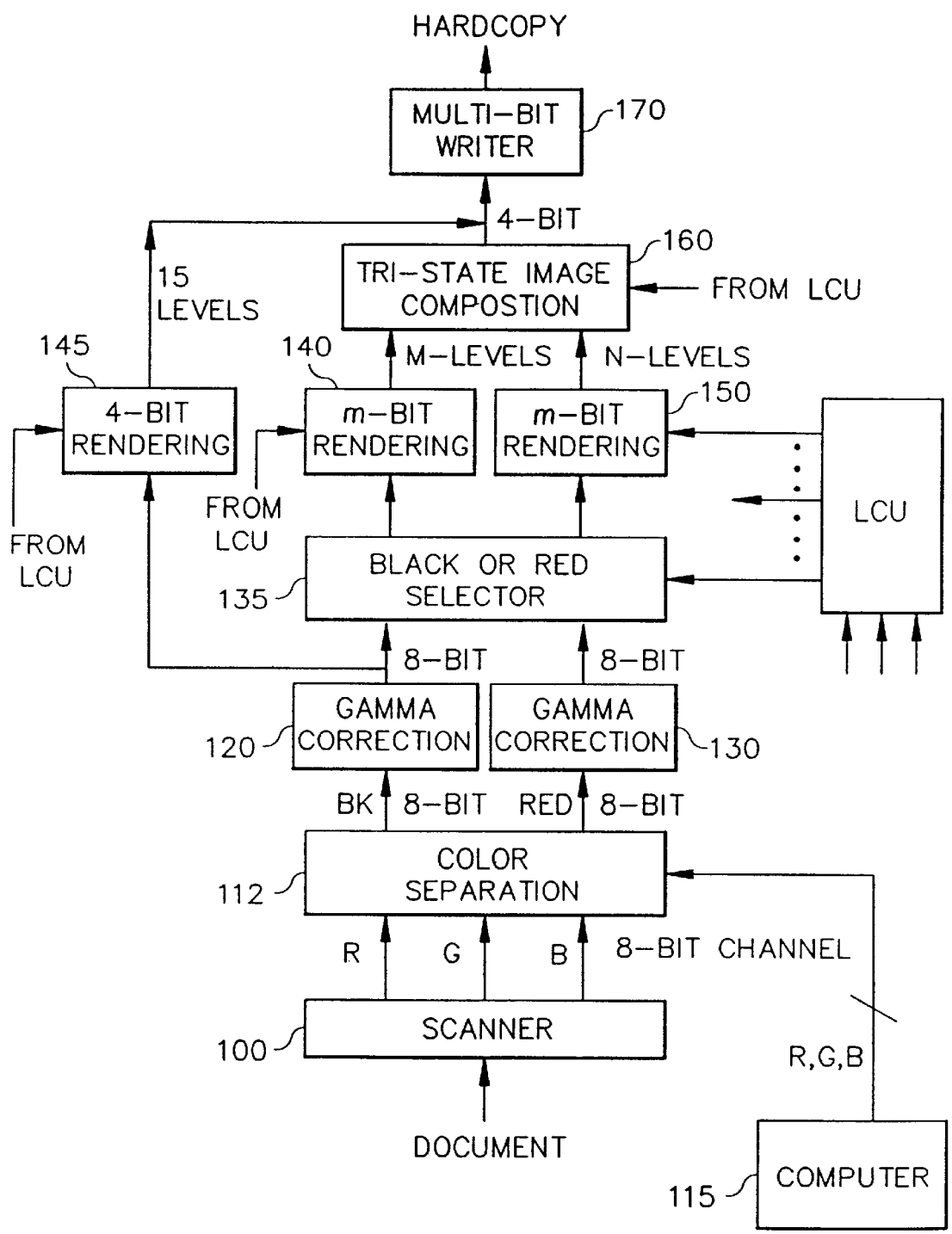
FIG. 2 is a schematic of one embodiment of a circuit in block diagram form and used in the apparatus of FIG. 1.

With reference now to FIGS. 1 and 2, a copier/printer includes a document scanner 100 that is provided for scanning a color document and outputting signals representing the sensed multicolor components of scanned pixel elements. Alternately, the image source of signals representing multicolor pixels may be a computer 115 or other source such as a data network, facsimile machine, video source, etc. Assume, for example, that the scanner scans the document at 400 dpi (dots per inch) and that the electronic writer also exposes the image member 10 with a similar pixel resolution of 400 dpi although such correspondence is not essential. Signals representing the red, green and blue reflection or density separation components of each pixel are processed in a processing circuit 110 in accordance with processing to be further described below. Assume in this example that each color separation component is represented or defined by 8-bits of data and thus 256 levels (including zero) are defined. The processor 110 includes a color separation processor 112 that analyzes each color pixel and determines an 8-bit signal representing the pixel in black and another 8-bit signal representing the pixel in another color such as red. Such determination may be made by a look-up table that is developed experimentally. Eight-bit signals representing the densities of the respective colors red and black for the particular pixel are output to a respective gamma correction processor 120, 130 for correction for the characteristics of the particular electrophotographic process. Assume in this example that the electronic exposure source or writer 170, that the laser 14 forms a part of, is capable of recording a pixel at 16 levels of density including zero which is definable by 4-bits of gray level image data Of course, it is known to have LED writers correctable for nonuniformity wherein the 4-bits of grey level data for each pixel is used to generate for example a 6-bit data signal that includes information for correction for nonuniformity (defined by N bits of data). See in this regard U.S. Pat. No. 5,300,960 the applicable contents of which are incorporated herein by reference.

The respective gamma correction processor 120, 130 outputs an 8-bit signal representing either a gamma corrected black or red pixel density. A selection processor circuit or program 135 to be discussed below is connected for the LCU for determining from the input gamma corrected black and red signals which color (black or red) the pixel will be printed in the tri-state image being composed. This determination could also be made based on the black and red signals generated by the color separation processor.

Figure 3:
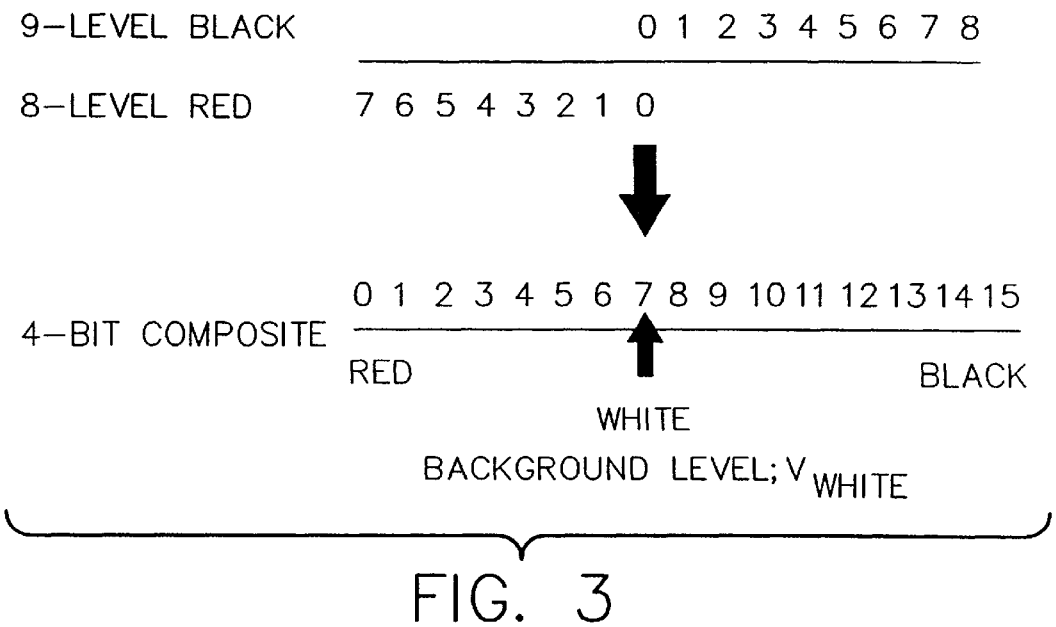
FIGS. 3 and 4 are tables illustrating conversion of black and red color density levels to exposure levels in a 4-bit composite exposure scheme using a single writer source.
Figure 4:
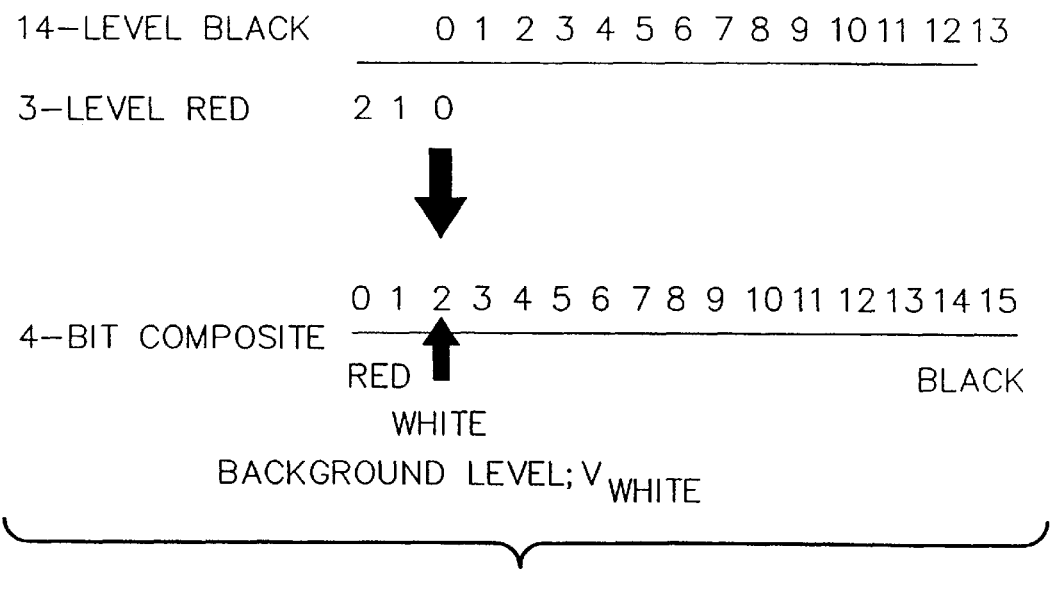

Pixels selected to be rendered in black on a tri-state process are subject to rendering by processor 140 as M levels of grey (defined by m bits of data wherein in this example m=4) while pixels selected to be rendered in red are subject to N levels rendering by processor 150 as N levels of grey (also defined by m bits of data). As may be seen in FIG. 3, in one example nine density levels including zero are allocated to a black pixel whereas say eight density levels including zero are allocated to red. The zero level is made the white background level which is a common level of exposure for the black and the red. Other examples are also possible as indicated in FIG. 4 wherein 14 levels of density including zero are allocated to black and only three levels including zero are allocated to red pixels. Of course, other allocation examples and bit depths are possible.

Figure 5:
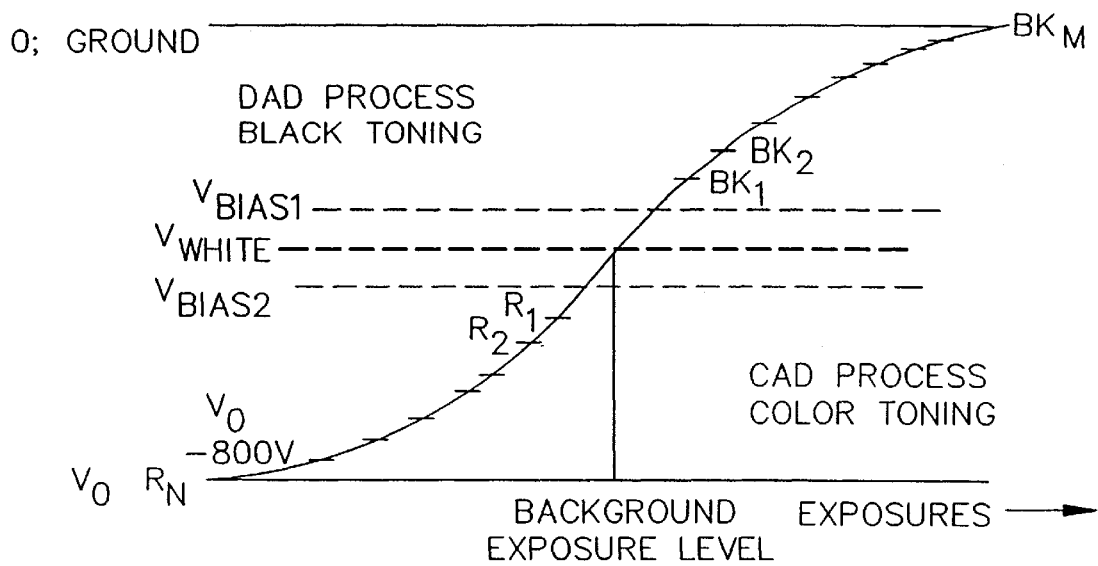
FIG. 5 is a graph of charge level vs. exposure in a tri-level imaging process in accordance with the invention and illustrating some but not all of the sub-levels of exposure within the respective DAD and CAD processes in accordance with the invention.
Figure 6:
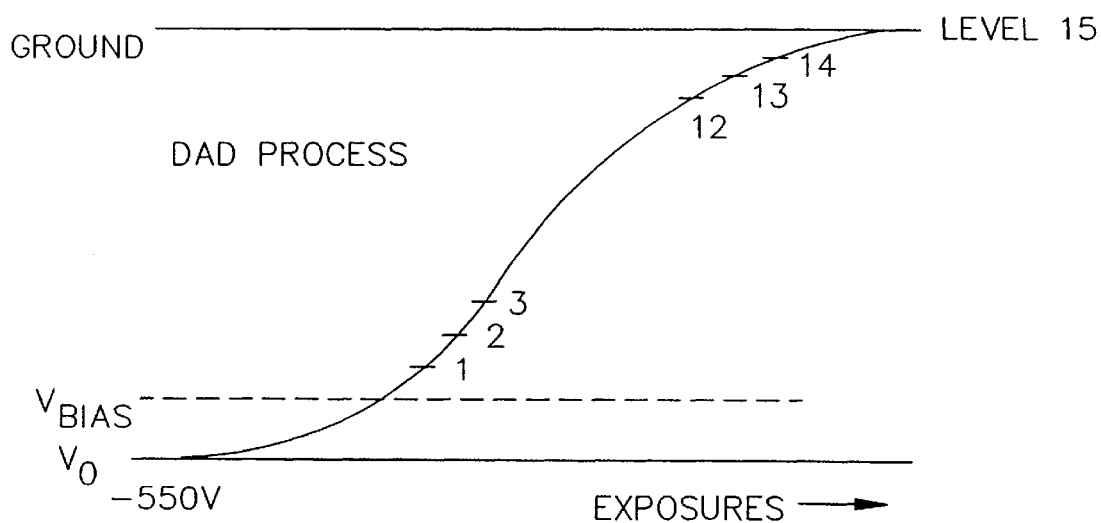
FIG. 6 is a graph of charge-level vs. exposure for a monochrome DAD process showing some but not all of the exposure levels also in accordance with the invention.

As may be seen in FIG. 5 which illustrates photoconductor charge levels in the tri-state electrophotographic process a uniform charge level of say −800 volts is provided as Vo charging relative to ground potential. $V_{white}$ may be made at about −400 volts. $v_{bias(BK)}$ which is the voltage bias on the black developer unit is made at about 31 300 volts. Exposed pixels to be developed in black and which are developed using the DAD (discharged area development) process are from zero or ground potential to about −250 volts with the densest pixels, $BK_M$, exposed to zero potential (i.e., maximum exposure) and the number of steps of density divided not necessarily evenly between the −250 volts as indicated with the least densest pixels $BK_1$ exposed at −250 volts. Exposed pixels to be developed in red using the CAD (charged area development) process are from −800 volts potential to about −550 volts with the densest red pixels, (RN), rendered at −800 volts potential and the least densest red pixels, $R_1$, being exposed to a level of about −550 volts. The bias on the red developer unit $V_{bias(R)}$ in this example may be about −500 volts.

In accordance with the invention, there is also provided a monochrome black electrophotographic process wherein a conventional DAD development process is provided. In this process, a uniform charge Vo of −550 volts relative to ground is provided on the photoconductive drum or web 10 by primary corona charger 12. The black development station is biased in this process to, say about, −450 volts. Pixels may be exposed within a range of ground (most dense) to about −400 volts (least dense). In this process, the 4-bits of rendering data are used to define 15 gray levels.

With reference again to FIG. 5, and as noted above, the tri-state imaging system advantageously combines both CAD process and DAD process with a single pass in the electrophotographic printing process. As indicated in FIG. 5 of the photoconductor film response curve (exposure vs. film potential) the black toner is developed with a DAD process while the color (for example, red) toner is developed with CAD process. In the tri-state EP process, the film is charged to $V_0$ (for example, −800 volts). The background is set in the middle of the film exposure potential as $V_{white}$. Each development toning station bias is then set at each side of $V_{white}$ as $V_{bias}$. Thus, for pixels to be printed in black, there are two kinds of processors 140, 145 designed for exposures. One processor 140 is designed for tri-state images while another processor 145 is designed for the monochrome black images. The processors 140, 145 may each be implemented to include a look-up table (LUT) or other device for rendering say an 8-bit signal into an m-bit signal of say 15 levels or M levels (M is a number less than 15 in this example, but more than 1).

A document (either color or black/white) is first scanned with a certain resolution (for example, 400 DPI resolution or 63.5 μm pitch) into red, green and blue separation color signals. The color separation circuitry extracts out one black and one color signal (for example, a red signal, although this could be another color other than red) from the three input RGB signals. Note that the original document may have images with multicolors present thereon while the printer is to record this image in only two colors such as black and red. When the document is scanned, signals representing the color components of each scanned pixel are generated. The scanned pixels may be expected to each have multicolor signal components in say RGB density space. The black signal carries basically the tone scale information of each original scanned pixel and the red signal carries an approximate hue and separation information of the original scanned pixel. Since there is no true color reproduction in two-color printing, the criterion of color separation process is set such that an accurate tone scale information of the original is carried in the black signal and more pleasing color is carried in the red signal. This color separation process could be operated as either color LAB, LUV space, printer CMYK space, or RGB density space. The extracted black or color signal is then processed separately and independently with gamma correction and multi-bit color signals are then combined in the tri-state image composition processor 160 before sending it to the writer for hardcopy.

Where writer 170 is a 400 DPI LED printhead which has 6-bit output (i.e., the writer has 64 different exposures), because of non-uniformity of each LED, the writer may have only 40 levels after non-uniformity correction. Assume, for example, the writer is configured for 4-bit images (that is, it has 15 different grey level image levels excluding the zero level) and the processors 140, 150 are designed for the tri-state 15 levels of exposure. In this tri-state image development process, the black signal uses DAD process to develop black toner while the color signal uses CAD process to develop color toner.

The tri-state image composition processor combines the rendered M levels black signal and N levels color signal (both numbers M and N do not include the zero level for background) into 4-bit image representation (the sum of M and N is less than or equal to 15 for the 4-bit image and thus either of M and N is less than 15). As indicated in the diagram of FIGS. 3 and 4, the tri-state image composition processor rearranges the M level black signal and N level color signal so that the color signal order of increasing density is "flipped" due to the nature of the CAD process while the black signal maintains the same order because of the nature of the DAD process. In the example of FIG. 3, the background level (for example, as set to exposure level 7) is selected so as to be aligned with Vwhite in the tri-state EP development process. This means that a pixel that is to be left undeveloped to white is exposed at exposure level 7. The tri-state image composition processor 150 may be combined with the processors 140, 145 so that the respective output represents a 4-bit signal appropriate for recording the particular red (color) or black pixel that is selected.

Since only either black or a color signal can be exposed on each pixel in the tri-state EP process, a decision must be made by processor 135 to choose either a black signal or a color signal. In one embodiment of the composition process illustrated by the flowchart, the decision is based on the density value (D) of each separate signal. In the following discussion reference will be made with regard to $D_{black}$ or $D_{blk}$, either of which refers to a density value of a black signal, and $D_{red}$ which refers to a density value of a red signal where red is a selected color. Generally, any color may be substituted for red where the color characteristics of the color toner is otherwise different from the black toner. Instead of $D_{red}$, a more general term $D_c$ may be used to indicate density of a color signal. For example, if $|D_{black} - D_{red}| > T_1$, wherein $T_1$ is a predetermined threshold value chosen through experimentation, and the red signal $D_{red}$ is greater than the black signal $D_{black}$, then the red pixel will be selected (i.e., the pixel will have less exposure level than the background level which is set in the EP development process) and being developed in the CAD process. Otherwise, if $|D_{black} - D_{red}| > T_1$ and the black signal $D_{black}$ is greater than the red signal $D_{red}$, the black pixel will be selected (i.e., the pixel will have a larger exposure level than the background level which is set in the EP development process) and will be developed in the DAD process. For those pixels that do not meet the above criteria (i.e., those pixels are probably in the lighter tone and less saturated color areas) a black pixel and color pixel are arranged alternately such as in a checkerboard pattern or a screen structure assignment wherein black blocks of pixels are alternated with red blocks of pixels. This strategy ensures that only one-color toner can be developed at each pixel. Consider the example of FIG. 3 and assume that based on density criteria that a red pixel of density 7 is to be rendered at a pixel location. Since background is exposure level 0 the exposure level of a red pixel of density 7 is determined by subtracting background level exposure value (7) from the density or pixel value for red (7) to obtain an exposure level of 0. Where a black pixel is to be printed, the pixel value is added to the background level to obtain the 4-bit exposure value for exposing the black pixel. The tables of FIGS. 3 and 4 illustrate the conversions for the respective examples provided in these Figures.

Figure 8:
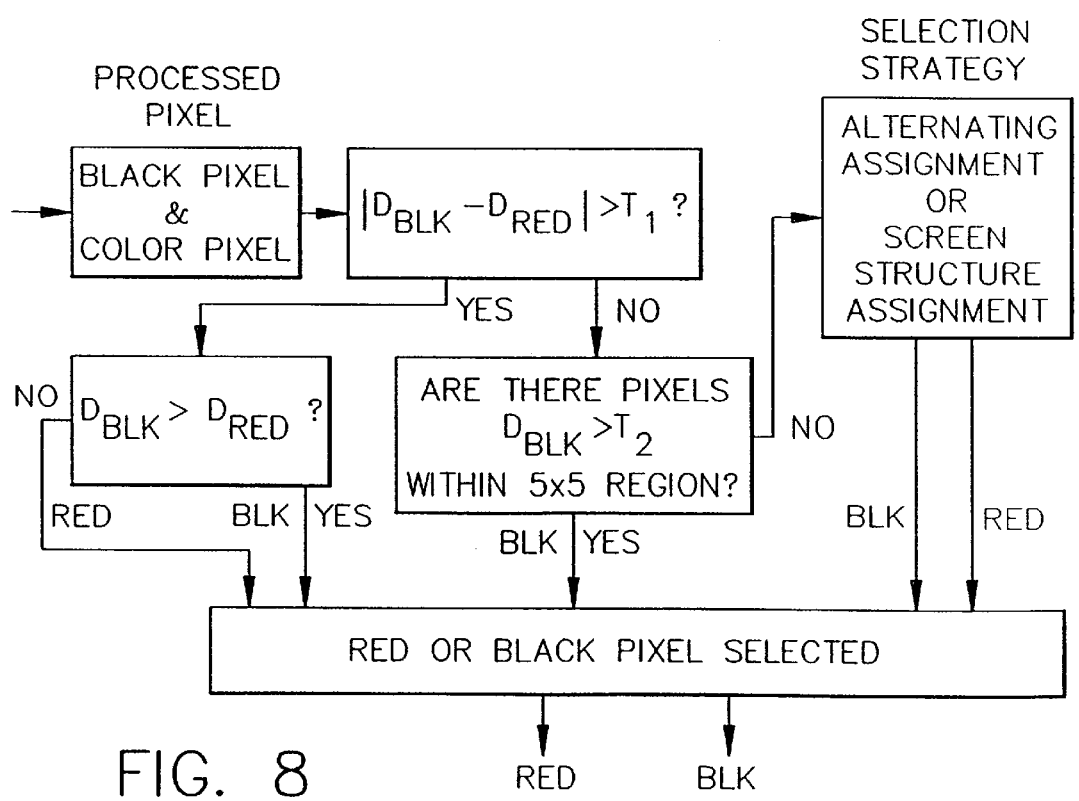

In another embodiment of the composition process illustrated by the flowchart of FIG. 8 and wherein the value of $|D_{black} - D_{red}|$ is not greater than threshold $T_1$, the decision is made such that the pixel resolution is preserved in the black signal along edges. The resultant pixel is selected depending on whether there are several processed black pixels in a neighboring region of pixels (say, 5 pixels in a 5×5 pixel region) that have a density greater than a predefined threshold density $T_2$ (or, for example, the exposure level of several neighboring processed pixels is greater than level 6 out of $D_{max}$ level 8 where rendering is according to the example of FIG. 3). If there are several such denser neighboring black pixels existing, then the current pixel has a higher priority to be assigned as a black pixel. Otherwise, the color signal and black signal will be assigned alternately such as a checkerboard pattern. In this arrangement, the black pixels are maintaining the connected integrity in the darker density area. Color fringing due to imperfect scanner response to edges can be eliminated through this embodiment. Furthermore, this alternately assigned color or black pixel can be arranged with screen structure (for example, 141 LPI dot screen structure) for blending smoothly the color pixels and black pixels together.

Similarly, the above practice can be applied to red pixels for maintaining their connected integrity in the color area by programming the algorithm or logic circuit to have a red preference rather than a black preference as provided for in FIG. 8. Thus, with reference to FIG. 9, there is shown a flowchart that is similar to that of FIG. 8; however, in the FIG. 9 embodiment, preference is provided for maintaining connection integrity of color pixels such as red. The threshold density values $T_1$, $T_2$ selected for the process of FIG. 8 need not be the same and are more likely to be different in the process of FIG. 9. Again, these values are chosen through experimentation and are designated in the flowchart as $T_1'$ and $T_2'$. Such preference (red or black) may be selectable by an operator of the copier/printer by inputs via a control panel to the LCU which then adjusts operation of the program or circuit 135 to either that of FIG. 8 or FIG. 9. The copier/printer of the invention may have the logic operations of FIGS. 7, 8 and 9 be selectable by the operator for use in processing a particular document with a particular one of these logic operations.

Figure 10:
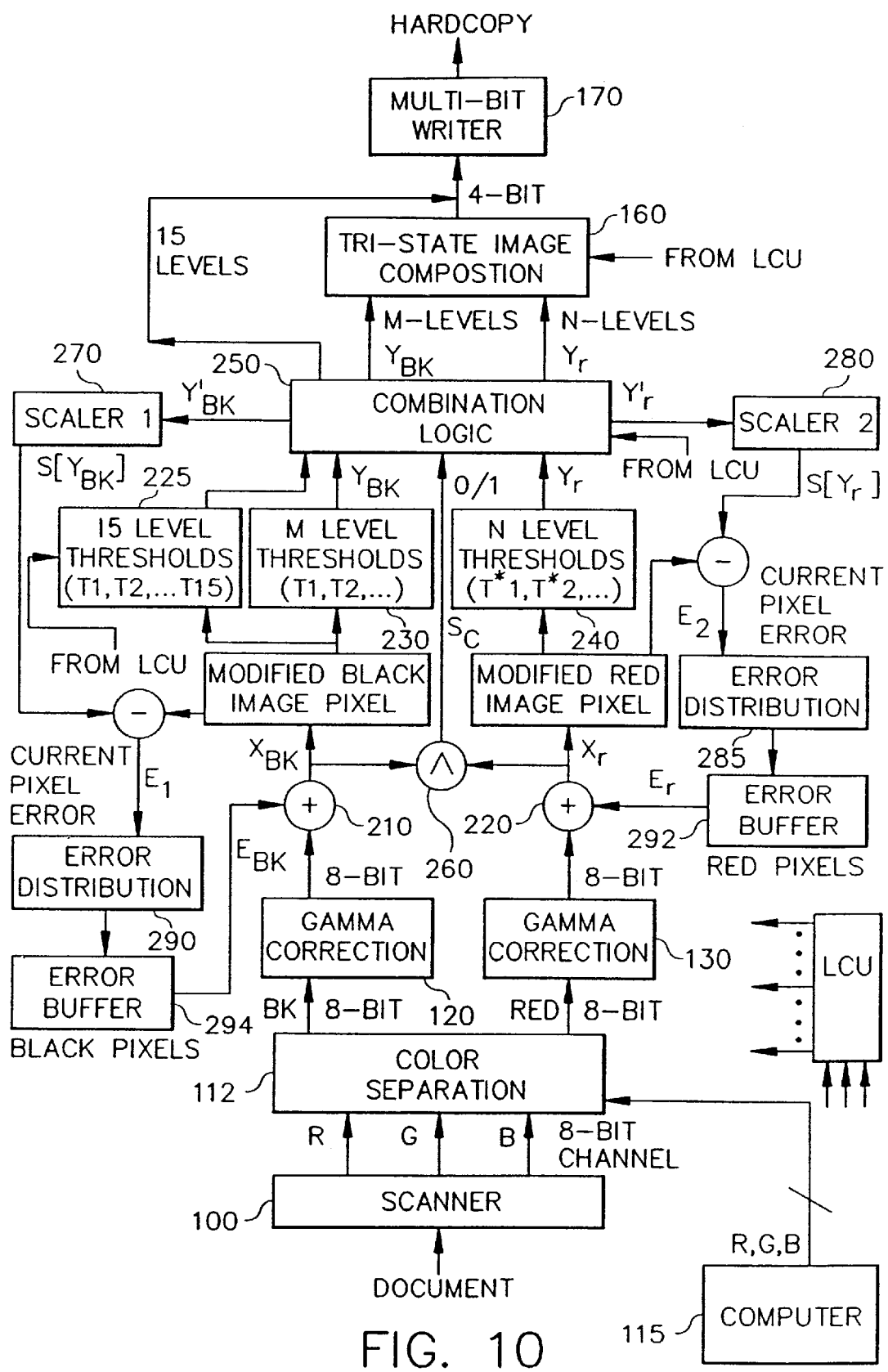
FIG. 10 is a schematic of an alternate embodiment in block diagram form that may be used in the apparatus of FIG. 1.

With reference to FIG. 10, there is shown an alternate embodiment of a circuit or logic flow diagram wherein calculations are made that may be implemented by a computer or programmed logic circuit or other circuit. In this figure, items identified with numbers similar to that shown in the embodiment of FIG. 2 may be considered to be either identical or similar items. In the embodiment of FIG. 2, the rendering elements 140, 145 and 150 may, for example, provide rendering using gray level halftone rendering algorithms. Examples of such algorithms are known, for example, see U.S. Pat. Nos. 5,258,849 and 5,258,850. In the embodiment of FIG. 10, an apparatus for processing digital image data that uses error diffusion is illustrated. As is known, image processing using error diffusion may provide enhanced rendition of certain images such as continuous tone images.

The concept of error diffusion results from the recognition that quantization errors introduced in thresholding operations when rendering previously processed pixels may be compensated by distributing errors to a current pixel being rendered. The scanner defines a pixel with 8-bits of density data whereas the printer in this example records at no more than 15 levels of grey in the monochrome mode and fewer levels in each of the tri-state modes. Thus, in rendering pixels to be recorded such pixels can be defined with only 4-bits of data. There is thus a need to transform the scanner output data to a form suited for that of the printer. In the rendering process for the monochrome image mode, there is provided a thresholding operation wherein an 8-bit grey level value is analyzed to see which of 15 ranges of values it is in. Since there is a range of density values for which a rendered value of a pixel may be assigned, it is convenient to assume that the midpoint of the range is the accurate rendition point and that quantization errors are defined from this midpoint range. The quantization error represents the difference between the density value and the midpoint with the appropriate sign. The use of the midpoint density is generally provided for except at the extremes; i.e., pixels rendered as grey level value 0 are deemed to have error measured from 0 and pixels rendered as grey level value 15 are deemed to have error measured from 255. Error diffusion for the tri-state exposure mode is based on similar principles but employs fewer threshold values.

In general, error diffusion is performed by considering the density value of a current pixel and generating a modified density value by adding errors occurring in rendering of prior neighboring pixels. Typically, these errors are weighted each by a suitable co-efficient so that errors in rendering pixels closer to the current pixel have more of an affect on calculating adjustments to generate the modified density value of the current pixel. Various error diffusion kernels are known for use in implementing the error diffusion process.

In FIG. 10, the 8-bits per pixel gamma corrected density values for black and red rendering of the current pixel are output from processors 120, 130. Error diffused from neighboring pixels that have been subjected to previous rendering processing as will be described are added respectively to the red and black gamma corrected density values at 210, 220.

The signal $X_{BK}$ output from 210 represents a modified image black pixel density for the current pixel whereas the signal $X_r$ represents a modified image red pixel density for the same current pixel. The signal or modified density value $X_{BK}$ is then thresholded by either thresholder 225 or 230. Thresholder 225 is used in the monochrome process where say 15 levels of black are to be recorded Thresholder 230 as noted in the example of FIG. 2 is thresholded to only M levels which is a number less than 15. Assume that tri-state recording is selected so that the LCU inhibits operation of thresholder 225 but allows operation of thresholder 230. The thresholder 230 determines which range of density values $X_{BK}$ represents and outputs a corresponding rendering pixel value $Y_{BK}$ associated with that range. Thresholder 240 performs a similar operation on the signals $X_r$ for the same current pixel under consideration to generate the signal $Y_r$ representing one of the N levels assigned to red pixels. Combination logic device 250 responds to a signal from selector 260 which determines whether the signal $Y_{BK}$ or $Y_r$ is to be output to tri-state image composition processor 160 which then assigns the appropriate 4-bit grey level for recording that pixel in accordance with the procedure described above for the examples illustrated in FIGS. 3 and 4. The pixel may then be recorded by the single multibit or grey level writer source 170.

Figure 7:
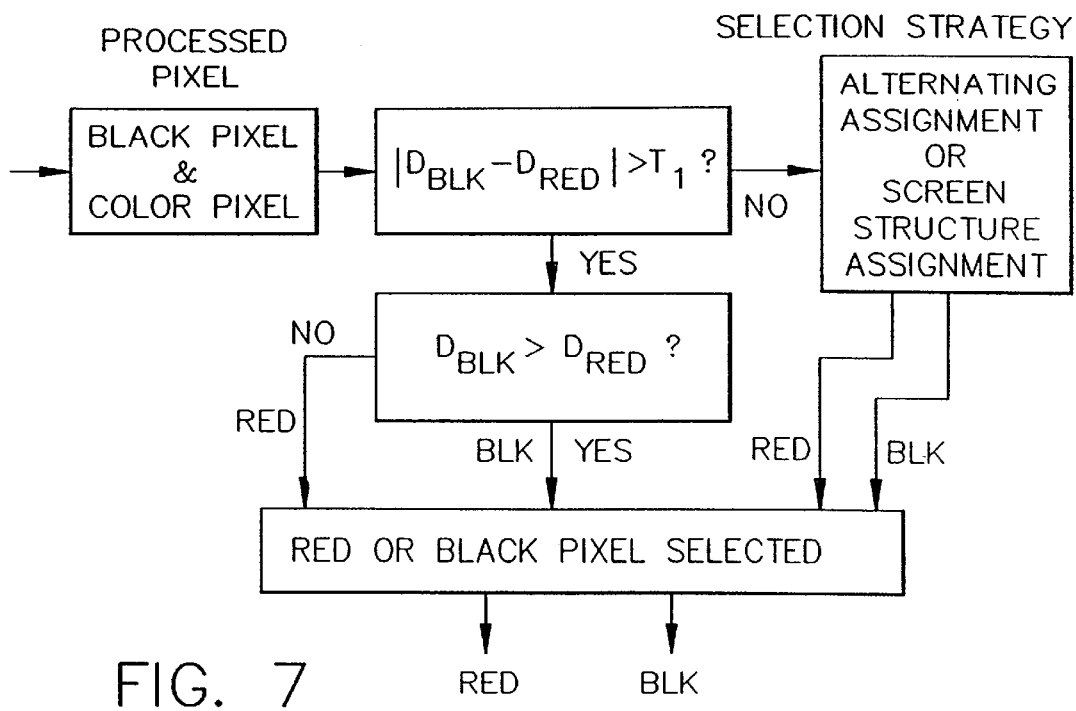
FIGS. 7, 8 and 9 are flowcharts illustrating examples of analysis of a multicolor pixel and determining if it is to be rendered as a black pixel or a color pixel in a tri-state imaging process.
Figure 9:
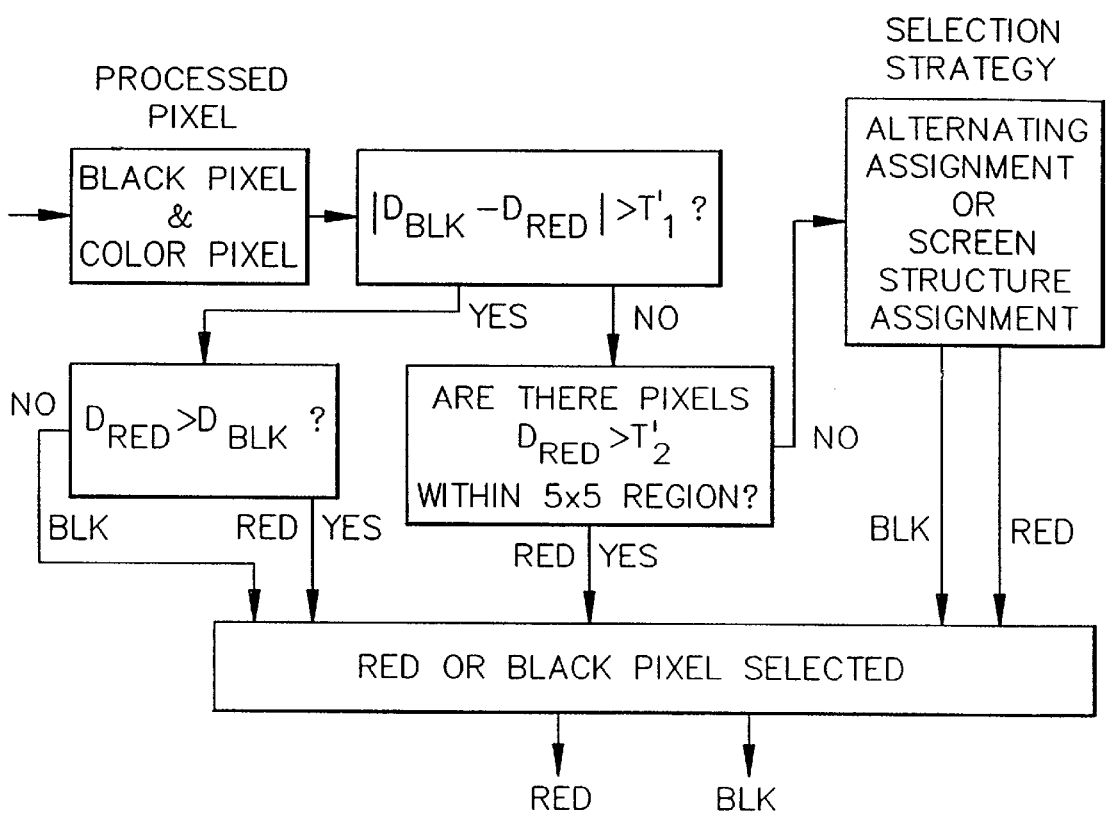

The selector 260 may be similar to that of selector 135 which employs the algorithms such as those of FIG. 7, 8 or 9 or one which merely compares density of signals $X_{bk}$, $X_r$ and renders a decision or uses some other algorithm for comparison.

As there is usually error associated in rendering each pixel, the signal $Y_{BK}$ is recirculated as signal $Y_{BK}$ to scaler processor 1 (270) while the signal $Y_r$ is recirculated as signal $Y_r$ to scaler processor 2 (280) for determination of the error in assigning $X_{bk}$, a value $Y_{BK}$ and similarly $X_r$, a value $Y_r$. The purpose of the scaler processors is to allow comparison of say $Y_r$ with $X_r$. $X_r$ values range from 0–255 whereas $Y_r$ values may range in one example from 0–2; and in another example 0–7. The scaler processors may each be a multiplier or LUT or other suitable device that assigns an appropriate scaled value $S[Y_r]$ or in the case of black, a scaled value $S[Y_{BK}]$ to the rendered value. The scaled values $S[Y_r]$ and $S[Y_{BK}]$ are compared respectively with the error diffusion modified image pixel density values $X_r$ and $X_{BK}$ to determine error in rendering of the current pixel and this is stored in error distribution processors 285, 290 as current pixel errors E1 for black and E2 for red. The processors 285, 290 operate an algorithm for calculating error that is stored in buffers 292, 294 and which is to be distributed to the next current pixel that is input having both black and red signal inputs. The processors 285, 290 include memory for storing respective errors of prior rendered pixels in the neighborhood (kernel) of the current pixel and provides for multiplication of the errors in accordance with a suitable programmed co-efficient. The sum of the weighted errors are then stored in respective buffers 292, 294 so that they may be added in adders 210, 220 with the current density value to define an 8-bit modified density value that is subject to thresholding by the grey level thresholders. Note that even though a red pixel may not be selected for output to the tri-state image processor 160, it is still subjected to an error diffusion determination for use in modifying the next current pixel.

In operation of the apparatus of FIG. 10, in the monochrome mode data for a pixel input as either a black and white pixel or as shown a pixel having multicolor components, i.e., R, G. B components, is analyzed such as in a color space context and the various components may be used as a signal representing density of the pixel are defined, for example, such as by providing a LUT in the color separation device 112 that defines a density for a black pixel in the monochrome mode based on the input R, G, B signals for that pixel. After gamma correction by processor 120, an error value (positive or negative) is added to this 8-bit density signal to define a modified black image pixel density value. The modified black image density value is input to thresholder 225 which outputs a 4-bit s per pixel rendering value defining a density of from 0–15 or 15 levels when zero is not included. The combination logic device 250 under control of the LCU in this mode outputs this 4-bit s per pixel rendered pixel value to the multibit writer 170. The multibit writer typically may include a memory for assembling a line or a page or multiple pages of data that are waiting to be printed as is known. The 4-bit s per pixel rendered value is also recirculated for error diffusion dispersion to future current pixels to be processed as discussed above except that scaler processor 1 includes a modified multiplier or a LUT to appropriately scale the rendered values for the monochrome black pixels for use in calculation of error in rendering the current black pixel from its modified black image pixel density value.

As can be seen different combinations of M levels of black signal and N levels of color signal, depending on the application, can be rendered and composed together in the tri-state image composition process. In the case where a monochrome black and white document is processed, the N levels of color pixel can be set to zero and therefore 15 levels can be totally assigned to black pixels for better image gradations. In this case, a different m-bit processor is provided for the monochrome black document Since the process parameters are different in tri-state and monochrome process, a set of process parameters are associated with the monochrome only m-bit processor. For example, a lesser value of $V_0$ (−550 V) is set for the monochrome process and also less exposure differences are provided for pixels recorded within any two adjacent exposure levels for the same 4-bit, 15 levels of image rendition.

The multibit writer 170 design, when used with an LED printhead that includes several thousand LEDs, includes a non-uniformity correction scheme embedded at each exposure level. Hence, after the non-uniformity correction, the exposure (per unit area of photo energy impinging on the film) at any level is evenly allocated.

In the tri-state process, the 15 exposures are set in such a way that the response is achieved linearly in lightness step for each of the DAD and the CAD processes. However, in the monochrome process where there is no CAD process involved, the exposures are set linearly in lightness step for only the DAD process.

The invention has been illustrated using various examples however, other examples and modifications may also be provided without departing from the invention described herein. While 3 m-bit processors are shown, they may be combined into a single unit. A logic and control unit may be provided as indicated in FIGS. 2 and 10 to control various circuits that are programmed or designed to perform the functions described herein or some or all of these functions may be implemented by a suitably programmed computer. The pixel data formed in accordance with the circuitry and process described herein may then be printed in accordance with either a monochrome printing process or a two-color tri-state imaging process, with a grey level printer to provide a high quality image having good registration of the two different toner images.

The monochrome and tri-state imaging processes are used to form separate images on different image frames of the charge retention member and thus typically would be transferred to different receiver sheets but the images could be transferred to the same receiver sheet on different sides thereof to form a duplex document in accordance with well known duplexing techniques or to the same side of one receiver sheet to form a very high quality monochrome image on one part of the receiver sheet in combination with a two-color image. Apparatus in a copier for combining two images formed on separate image frames onto the same side of a receiver sheet are also well known; see, for example, U.S. Pat. No. 4,794,421. The image frames may be spatially separated on the charge retentive member or the same area may be again used after cleaning so that the image frame may be said to be temporally separated.

The invention has been described by way of examples wherein black pixels are developed using the DAD process and color pixels are developed using the CAD process. However, this could be reversed assuming the charging characteristics of the toners are compatible with the method of processing. In addition, regardless of whether the color pixel is developed with a DAD process or a CAD process, the arrangement of grey levels printing assigned exposures may be made so that the color pixel is assigned more available density levels than the black pixel. Thus, generally, description herein of signals referred to as $D_{black}$ and $D_{red}$ are not intended to be limited to these specific colors and are merely to illustrate two different colors. The use of 8-bits per pixel for scanned pixel data and 4-bits per pixel for rendering are merely descriptions of examples of the preferred embodiment, the invention, of course, is not limited to these particular bit depths.

In the examples described with tri-state xerography, there is disclosed exposures of CAD and DAD images with plural sub-level exposures. However, not all aspects of the invention are limited to requiring such sub-level exposures. Thus, methods and apparatus employing error diffusion and/or processing of pixels, having multicolor components in accordance with a set of criteria may, in accordance with the invention, be accomplished using tri-level xerography.

The invention has been described in detail with particular reference to preferred embodiments thereof and illustrative examples, but it will be understood that variations and modifications can be effected within the spirit and scope of the invention.

What is claimed is:

1. A method of forming images on a charge retentive surface using a single writer source, said method comprising the steps of:

uniformly charging said surface;

exposing in one image frame of said surface on a pixel by pixel basis with varying amounts of exposure by said source for at least some pixels to form a latent image including
   (a) a charged area developable (CAD) latent image having at least some exposed pixels at various different sub-levels of exposure within said charged area developable image,
   (b) a discharged-area developable (DAD) latent image having at least some exposed pixels at various different sub-levels of exposure within said discharged area developable image, and
   (c) a background area;

developing said DAD and CAD latent images with toners of two different colors from respective two different developer sources;

exposing a second image frame of said uniformly charged surface on a pixel by pixel basis with varying amounts of exposure by said source for at least some pixels to form a monochrome latent image wherein at least some exposed pixels are exposed at various different levels of exposure; and developing said monochrome latent image using one of said developer sources and wherein a voltage bias on said one of said developer sources is adjusted to a different bias when operating in a monochrome exposure mode than when operating in a two-color exposure mode.

2. The method of claim 1 and including the step of transferring the developed DAD and CAD latent images and the developed monochrome image to different receiver sheets.

3. The method of claim 1 and including the step of transferring the developed DAD and CAD images and the developed monochrome image to the same receiver sheet.

4. The method of claim I and wherein the number of levels of exposure in forming the monochrome latent image are greater than the number of sub-levels of exposure in forming either of the CAD latent image and the DAD latent image.

5. The method of claim 1 and including processing signals representing a pixel, having multicolor components, in accordance with a set of criteria to determine whether the pixel is to be recorded on said one image frame as one color or the other color of said two different colors.

6. The method of claim 5 and wherein said one color is black and black pixels are recorded in more sub-levels than said other color on said one image frame.

7. The method of claim 6 and wherein the set of criteria includes: if the absolute value of the difference between the density of the pixel as rendered in black ($D_{blk}$) and the density of the pixel in the other color (Dc) is greater than a threshold value ($|D_{blk}-D_c|>T_1$) and $D_{blk}>$Dc then the pixel is recorded as a black pixel and if $D_{blk}<$Dc, then the pixel is recorded in said other color.

8. The method of claim 7 and wherein if $|D_{blk}-D_c|<T_1$ selection of color for recording the pixel is made on an alternating basis.

9. The method of claim 7 and including the step of if $|D_{blk}-D_c|<T_1$, a region of neighboring pixels is examined to determine if there are several pixels meeting the criterion $D_{blk}>T_2$ wherein $T_2$ is a second threshold value, and if this criterion is met the pixel is recorded as black.

10. The method of claim 9 and including the step of if $D_{blk}>T_2$ is not true for plural pixels in the region then selection of color for recording the pixel is made on an alternating basis.

11. The method of claim 5 and wherein the set of criteria includes: if the absolute value of the difference between the density of the pixel of said one color and the density of said pixel in the other color is greater than a threshold value, and the density of said one color is greater than the density in the other color, then the pixel is recorded in said one color and if the density of said one color is less than the density of the other color, then the pixel is recorded in said other color.

12. The method of claim 11 and wherein if the absolute value of the difference between the density of the pixel of said one color and the density of said pixel in the other color is less than the threshold value selection of color for recording the pixel is made on an alternating basis.

13. The method of claim 11 and including the step of if the absolute value of the difference between the density of the pixel of said one color and the density of said pixel in the other color is less than the threshold value, a region of neighboring pixels is examined to determine if there are several pixels meeting a criterion of each having density in the said one color that is greater than a second threshold value, and if this criterion is met, the pixel is recorded in said one color.

14. A method of forming two-color images on a charge retentive surface using a single writer source, said method comprising the steps of:

uniformly charging said surface;

exposing in one image frame of said surface on a pixel by pixel basis with varying amounts of exposure by said source at least some pixels to form a latent image including
(a) a charged area developable (CAD) latent image having at least some pixels within said charged area developable image,
(b) a discharged-area developable (DAD) latent image having at least some pixels within said discharged area developable image,
(c) a background area;

developing said CAD and DAD latent images with toners of two different colors from respective two different developer sources; and including the step of processing signals representing a pixel, having multicolor components, in accordance with a set of criteria to determine whether the pixel is to be recorded on said one image frame as one color or the other color of said two different colors; and wherein said one color is black and wherein the set of criteria includes: if the absolute value of the difference between the density of the pixel in black ($D_{blk}$) and the density of the pixel in the other color (Dc) is eater than a threshold value ($|D_{blk}-D_c|>T_1$ and $D_{blk}>D_c$, then the pixel is recorded as a black pixel and if $D_{blk}<D_c$, then the pixel is recorded in said other color.

15. The method of claim 14 and wherein if $|D_{blk}-D_c|<T_1$, selection of color for recording the pixel is made on an alternating basis.

16. The method of claim 14 and including the step of if $|D_{blk}-D_c|<T_1$, a region of neighboring pixels is examined to determine if there are several pixels meeting the criterion $D_{blk}>T_2$ wherein $T_2$ is a second threshold value, and if this criterion is met, the pixel is recorded as black.

17. The method of claim 16 and including the step of if $D_{blk}>T_2$ is not true for plural pixels in the region then selection of color for recording the pixel is made on an alternating basis.

18. The method of claim 14 and wherein in forming said charged area developable image pixels are exposed with varying amounts of exposure by said source.

19. The method of claim 11 and wherein the set of criteria includes: if the absolute value of the difference between the density of the pixel of said one color and the density of said pixel in the other color is greater than a threshold value, and the density of said one color is greater than the density in the other color, then the pixel is recorded in said one color and if the density of said one color is less than the density of the other color, then the pixel is recorded in said other color.

20. The method of claim 19 and wherein if the absolute value of the difference between the density of the pixel of said one color and the density of said pixel in the other color is less than the threshold value selection of color for recording the pixel is made on an alternating basis.

21. The method of claim 19 and including the step of if the absolute value of the difference between the density of the pixel of said one color and the density of said pixel in the other color is less than the threshold value, a region of neighboring pixels is examined to determine if there are several pixels meeting the criterion that the density of the pixel in the said one color is greater than a second threshold value and if this criterion is met, the pixel is recorded in said one color.

22. An apparatus for forming images, said apparatus comprising:

a charge retentive surface;

means for uniformly charging said surface;

a single writer source including means for exposing in one image frame of said surface on a pixel by pixel basis with varying amounts of exposure at least some pixels to form a latent image including
(a) a charged area developable latent image having at least some exposed pixels at various different sub-levels of exposure within said charged area developable image;
(b) a discharged-area developable latent image having at least some exposed pixels at various different sub-levels of exposure within said discharged area developable image; and
(c) a background area;

means for developing the latent images with toners of two different colors from respective two different developer sources;

said writer source including means for exposing a second image frame of said uniformly charged surface on a pixel by pixel basis with varying amounts of exposure for at least some pixels to form a monochrome latent image wherein at least some exposed pixels are exposed at various different levels of exposure; and means for developing said monochrome latent image using one of said developer sources; and means for adjusting a voltage bias on said one of said developer sources to a different bias when operating in a monochrome exposure mode than when operating in a two-color exposure mode.

23. An apparatus for forming two-color images on a charge retentive surface, said apparatus comprising:

means for uniformly charging said surface;

means for exposing in one image frame of said surface on a pixel by pixel basis with varying amounts of exposure by said source at least some pixels to form a latent image including
(a) a charged area developable (CAD) latent image having at least some pixels within said charged area developable image,
(b) a discharged-area developable (DAD) latent image having at least some pixels within said discharged area developable image, and
(c) a background area;

means for developing said CAD and DAD latent images with toners of two different colors from respective two different developer sources;

means for processing signals representing a pixel, having multicolor components, in accordance with a set of criteria to determine whether the pixel is to be recorded on said one image frame as one color or the other color of said two different colors; and wherein said means for exposing provides various amounts of exposure to record pixels in the CAD latent image with different densities, and said exposure means is operative to expose some of said pixels in the CAD latent image, and to expose the pixels in the DAD latent image and to expose and form the background area with only a single pass of the image frame past the means for developing said CAD and DAD latent images.

24. A method of forming images on a charge retentive surface using a single writer source, said method comprising the steps of:

uniformly charging said surface;

exposing in one image frame of said surface on a pixel by pixel basis with varying amounts of exposure by said source for at least some pixels to form a latent image including
(a) a charged area developable (CAD) latent image having at least some exposed pixels at various different sub-levels of exposure within said charged area developable image,
(b) a discharged-area developable (DAD) latent image having at least some exposed pixels at various different sub-levels of exposure within said discharged area developable image, and
(c) a background area;

developing said DAD and CAD latent images with toners of two different colors from respective two different developer sources;

exposing a second image frame of said uniformly charged surface on a pixel by pixel basis with varying amounts of exposure by said source for at least some pixels to form a monochrome latent image wherein at least some exposed pixels are exposed at various different levels of exposure;

developing said monochrome latent image using one of said developer sources; and wherein the different levels of exposure in the monochrome latent image mode and the different sub-levels of exposure in at least one of the CAD and DAD latent images have the exposures uniformly stepped in lightness space.

25. The method of claim 14 and wherein at least one of the CAD and the DAD latent images have the exposures uniformly stepped in lightness space.

26. A method of forming two-color images on a charge retentive surface using a single writer source, said method comprising the steps of:

uniformly charging said surface;

exposing in one image frame of said surface on a pixel by pixel basis with varying amounts of exposure by said source at least some pixels to form a latent image including
(a) a charged area developable (CAD) latent image having at least some pixels within said charged area developable image,
(b) a discharged-area developable (DAD) latent image having at least some pixels within said discharged area developable image, and
(c) a background area;

developing said CAD and DAD latent images with toners of two different colors from respective two different developer sources; and including the steps of modify ing a value associated a pixel with an error value associated with rendering of prior processed pixels to obtain a modified pixel value and in response to signals representing said modified pixel value determining whether the pixel is to be recorded on said one image frame as one color or the other color of said two different colors.

27. The method of claim 26 and including the step of inputting a signal for the pixel representing multicolor components for the pixel and generating signals representing a value associated with said pixel in said one color and a value associated with said pixel in said other color.

28. The method of claim 27 and wherein in the step of modifying the value associated with said pixel in said one color the value associated with said pixel in said other color are modified with an error value.

* * * * *